US012076594B2

(12) United States Patent
Hung et al.

(10) Patent No.: US 12,076,594 B2
(45) Date of Patent: Sep. 3, 2024

(54) FALL ARRESTER

(71) Applicant: YOKE INDUSTRIAL CORP., Taichung (TW)

(72) Inventors: Wei-Chieh Hung, Taichung (TW); Wen-Ming Liao, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 489 days.

(21) Appl. No.: 17/101,195

(22) Filed: Nov. 23, 2020

(65) Prior Publication Data

US 2022/0161071 A1 May 26, 2022

(51) Int. Cl.
*A62B 35/00* (2006.01)
*A62B 1/10* (2006.01)
*A62B 1/18* (2006.01)

(52) U.S. Cl.
CPC ............ *A62B 35/0093* (2013.01); *A62B 1/10* (2013.01); *A62B 1/18* (2013.01)

(58) Field of Classification Search
CPC .......... A62B 35/0093; A62B 1/10; A62B 1/18
See application file for complete search history.

(56) References Cited

U.S. PATENT DOCUMENTS 3,760,910 A * 9/1973 Koshihara ............... F16D 59/00 182/237
6,279,682 B1 * 8/2001 Feathers ............ A62B 35/0093 182/239
8,226,024 B2 * 7/2012 Meillet .............. A62B 35/0093 242/380
8,251,176 B2 * 8/2012 Meillet .................... A62B 1/08 182/230
8,256,574 B2 * 9/2012 Griffiths ................... A62B 1/08 242/383.3

(Continued)

FOREIGN PATENT DOCUMENTS

CN 201862170 U 6/2011
CN 206334225 U 7/2017

(Continued)

OTHER PUBLICATIONS

Search Report for CN202011060224.3, Issued Jun. 30, 2022, Total of 3 pages.

(Continued)

*Primary Examiner* — Jessica L Laux
*Assistant Examiner* — Kathleen M. McFarland
(74) *Attorney, Agent, or Firm* — Apex Juris, pllc; R. Lynette Wylie

(57) ABSTRACT

A fall arrester includes a holder, rotating drum, braking device, and dust cover. The rotating drum is pivotally provided on and within the holder, and includes a main body and at least one pawl; the main body has an accommodating part to be wound by a cable and a setting part. The pawl is pivotally provided on the setting part, and the braking device is fixed to the holder and between the holder and the setting part. When the rotating drum rotates quickly by pull of the cable, the pawl would pivot and make a part thereof abut against a part of the braking device to stop the rotating drum. The dust cover is fixed to the setting part, and thereby prevents dust from affecting the pawl and the braking device located therein, and thus to enhance safe use thereof.

3 Claims, 7 Drawing Sheets

(56) References Cited

U.S. PATENT DOCUMENTS 8,469,149 B2 * 6/2013 Meillet .................... B66D 1/54 242/378.2
8,490,751 B2 * 7/2013 Allington ............... H02K 7/116 182/234
8,511,434 B2 * 8/2013 Blomberg .......... A62B 35/0081 182/189
8,528,694 B2 * 9/2013 Meillet .............. A62B 35/0056 254/368
8,800,715 B2 * 8/2014 Olson ...................... A62B 1/10 182/237
8,991,556 B2 * 3/2015 Auston .............. A62B 35/0093 182/234
9,056,753 B2 * 6/2015 Luntz ..................... B66D 3/046
9,121,462 B2 * 9/2015 Casebolt ............ A62B 35/0093
9,199,103 B2 * 12/2015 Hetrich .................... A62B 1/10
10,029,128 B2 * 7/2018 Lin ........................ A62B 35/04
10,143,867 B2 * 12/2018 Su ...................... A62B 35/0075
10,265,555 B2 * 4/2019 Wu .................... A62B 35/0093
10,279,205 B2 * 5/2019 Hung ...................... F16D 59/02
10,413,760 B2 * 9/2019 Pass ................... A62B 35/0068
10,413,761 B2 * 9/2019 Hetrich ............. A62B 35/0093
10,556,138 B2 * 2/2020 Fegley ............... A62B 35/0093
10,576,310 B2 * 3/2020 Hung ................. A62B 35/0025
10,653,903 B2 * 5/2020 Jones ................. A62B 35/0093
10,661,103 B2 * 5/2020 Griffiths ............. A62B 35/0093
10,688,323 B2 * 6/2020 Wolner .................... A62B 1/10
10,744,354 B2 * 8/2020 Choate ............... A62B 35/0093
10,765,895 B2 * 9/2020 Wang ................. B65H 75/4442
10,828,516 B2 * 11/2020 Chabod .................... A62B 1/10
10,960,243 B2 * 3/2021 Chen ........................ A62B 1/10
10,981,760 B2 * 4/2021 Farkash ................ F16D 63/008
10,987,528 B2 * 4/2021 Wang ....................... A62B 1/10
11,117,002 B2 * 9/2021 Farrell ................... A62B 35/04
11,401,138 B2 * 8/2022 Bonnet .................. B66D 3/046
11,497,943 B2 * 11/2022 Pan .......................... A62B 1/10
11,534,634 B2 * 12/2022 Guzman .................. A62B 1/10
11,535,483 B2 * 12/2022 Choate ............... B65H 75/4428
11,541,256 B2 * 1/2023 Blackford ................ A62B 1/10
2008/0041661 A1 * 2/2008 Meillet .............. A62B 35/0056 182/13
2009/0178887 A1 * 7/2009 Reeves .................... A62B 1/10 182/239
2010/0224448 A1 * 9/2010 Wolner .................... A62B 1/10 182/234
2010/0308149 A1 * 12/2010 Allington ........... A63B 69/0048 242/379
2011/0084158 A1 * 4/2011 Meillet .............. A62B 35/0093 242/385.4
2011/0209948 A1 * 9/2011 Auston .................. B65H 75/28 188/68
2011/0278095 A1 * 11/2011 Hetrich .................... A62B 1/10 182/231
2011/0297778 A1 * 12/2011 Meillet .............. A62B 35/0093 242/376
2011/0315481 A1 * 12/2011 Griffiths ................... A62B 1/08 188/110
2012/0118670 A1 * 5/2012 Olson ...................... A62B 1/10 182/232
2012/0145481 A1 * 6/2012 Jones ................. A62B 35/0093 182/231
2013/0105247 A1 * 5/2013 Casebolt .................. A62B 1/10 188/185
2013/0277631 A1 * 10/2013 Luntz ..................... B66D 3/046 254/391
2016/0096048 A1 * 4/2016 Fegley ..................... A62B 1/10 182/232
2016/0367844 A1 * 12/2016 Yang .................. A62B 35/0093
2017/0252591 A1 * 9/2017 Hetrich ................... F16F 9/145
2017/0361136 A1 * 12/2017 Wu .................... A62B 35/0093
2018/0015312 A1 * 1/2018 Jones ..................... A62B 35/04
2018/0028848 A1 * 2/2018 Pass ................... A62B 35/0068
2018/0078795 A1 * 3/2018 Lin ........................ A62B 35/04
2018/0147425 A1 * 5/2018 Su ...................... A62B 35/0093
2018/0161608 A1 * 6/2018 Choate ............... A62B 35/0093
2018/0169446 A1 * 6/2018 Griffiths ............. A62B 35/0093
2018/0289987 A1 * 10/2018 Hung ................. A62B 35/0093
2018/0333598 A1 * 11/2018 Hung ................. A62B 35/0093
2018/0345049 A1 * 12/2018 Hung ................. A62B 35/0075
2019/0030381 A1 * 1/2019 Hung ................. A62B 35/0093
2019/0084813 A1 * 3/2019 Farkash ................... B61H 9/02
2019/0209877 A1 * 7/2019 Farrell .................. F16D 63/008
2019/0247683 A1 * 8/2019 Farrell ...................... F16F 7/12
2019/0275356 A1 * 9/2019 Jones ................. A62B 35/0093
2019/0308041 A1 * 10/2019 Harding ............. A62B 35/0075
2020/0023211 A1 * 1/2020 Chang ...................... A62B 1/10
2020/0031638 A1 * 1/2020 Chabod .................... A62B 1/10
2020/0078617 A1 * 3/2020 Wang ....................... A62B 1/10
2020/0078618 A1 * 3/2020 Wang ..................... B65H 75/40
2020/0078620 A1 * 3/2020 Wang ................. A62B 35/0093
2020/0078621 A1 * 3/2020 Chen ........................ A62B 1/10
2020/0129791 A1 * 4/2020 McMaster ............. A01M 31/02
2020/0206550 A1 * 7/2020 Blackford ............ G08B 21/043
2020/0330800 A1 * 10/2020 Pan .......................... A62B 1/16
2021/0086002 A1 * 3/2021 Bailey ................... F16D 63/002
2021/0122617 A1 * 4/2021 Bonnet .................... B66D 3/10
2021/0170208 A1 * 6/2021 Sun .......................... A62B 1/10
2021/0205639 A1 * 7/2021 Tseng ....................... A62B 1/14
2021/0273545 A1 * 9/2021 Liu ...................... H02K 49/046
2021/0290986 A1 * 9/2021 Bailey ...................... A62B 1/08
2021/0308502 A1 * 10/2021 Blackford .......... A62B 35/0093
2021/0308503 A1 * 10/2021 Guzman .................. A62B 1/10
2022/0105374 A1 * 4/2022 Jacob ................. A62B 35/0093
2022/0134164 A1 * 5/2022 Bourquard ............... A62B 1/06 482/8
2022/0161071 A1 * 5/2022 Hung ....................... A62B 1/10
2022/0161072 A1 * 5/2022 Hung ................. A62B 35/0093
2022/0176173 A1 * 6/2022 Lopez ................ A62B 35/0093
2022/0233891 A1 * 7/2022 Nieuwenhuis ........... B66D 1/26
2022/0234868 A1 * 7/2022 Feng .................. A62B 35/0093
2022/0401765 A1 * 12/2022 Rodriguez ......... A62B 35/0093

FOREIGN PATENT DOCUMENTS

CN 107826077 A 3/2018
CN 209060406 U 7/2019
CN 110585613 A 12/2019
CN 110869089 A 3/2020
CN 211357505 U 8/2020
CN 213912040 U 8/2021
GB 1498226 A 1/1978

OTHER PUBLICATIONS

Translation of Abstract of CN211357505, Total of 1 page.
Translation of Abstract of CN107826077, Total of 1 page.
Translation of Abstract of CN213912040, Total of 1 page.
Translation of Abstract of CN209060406, Total of 1 page.
Translation of Abstract of CN110585613, Total of 1 page.
Translation of Abstract of CN201862170, Total of 1 page.
Translation of Abstract of CN206334225, Total of 1 page.
Search Report for CN202011060224.3, Issued on Nov. 15, 2022, Total of 2 pages.
Translation of Abstract of CN110869089, Total of 1 page.

* cited by examiner

FALL ARRESTER

BACKGROUND OF THE INVENTION

1. Technical Field

The present invention relates generally to a fall arrester, and more particularly to a fall arrester with dustproof effect.

2. Description of Related Art

When working in high-altitude places, the operator must be equipped with fall arresters. An end of a fall arrester is connected to a support, and the cable or lifeline in the fall arrester is fastened to the operator. In this way, if the operator accidentally falls from a height, the sudden falling force will drive a braking device in the fall arrester to avoid the cable or lifeline from continuing to be pulled out by the falling force, or to reduce the speed at which the cable or lifeline is pulled out, so that the safety of operator would be maintained.

A conventional fall arrester usually includes a case to prevent external dust or impurities from entering the inside of the fall arrester, wherein the case has an opening for the cable or lifeline to enter and exit the case. However, during the cable or lifeline is being wound back to the case, the external dust or impurities could be easily brought into the case. Such dust or impurities would accumulate in the braking device easily, which affects the effect of the driven braking device and even causes the braking device to get stuck so that the fall arrester could lose its emergency lock function. Thus, the conventional fall arrester is unable to ensure the safety of work. From the above, the conventional fall arrester has to be improved.

BRIEF SUMMARY OF THE INVENTION

In view of the above, the primary objective of the present invention is to provide a fall arrester which can prevent dust from accumulating in the braking device and the at least one pawl of the fall arrester, which could affect the operation of the fall arrester.

The present invention provides a fall arrester including a holder, a rotating drum, a braking device, and a dust cover. The holder includes a first arm and a second arm. The rotating drum is pivotally provided on the holder and located between the first arm and the second arm; the rotating drum includes a main body and at least one pawl, wherein the main body has an accommodating part and a setting part; the accommodating part is provided to be wound by a flexible long strip; the at least one pawl has a first abutting portion and is pivotally provided on the setting part; when the rotating drum rotates at a speed which is equal to or more than a predetermined speed, the first abutting portion of the at least one pawl pivots form a first position to a second position. The braking device has a convex portion and is fixed to the first arm by the convex portion so that the braking device is located between the first arm and the setting part; the braking device further has a second abutting portion which is located on a rotation path of the first abutting portion in the second position, wherein the rotation path is formed by the rotation of the rotating drum; thus, the second abutting portion can abut against the first abutting portion to stop the rotation of the rotating drum. The dust cover is fixed to the setting part and is located between the setting part and the first arm; an enclosed space is formed between the dust cover and the setting part, and the at least one pawl and the braking device are located in the enclosed space; the dust cover has a hole, and the convex portion protrudes from the hole.

The effect of the present invention is that, the dust cover covers the braking device and the at least one pawl so that the braking device and the at least one pawl are located in the enclosed space formed between the dust cover and the setting part, which prevents dust or impurities from accumulating in the braking device and the at least one pawl, which affects the operation of the fall arrester.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
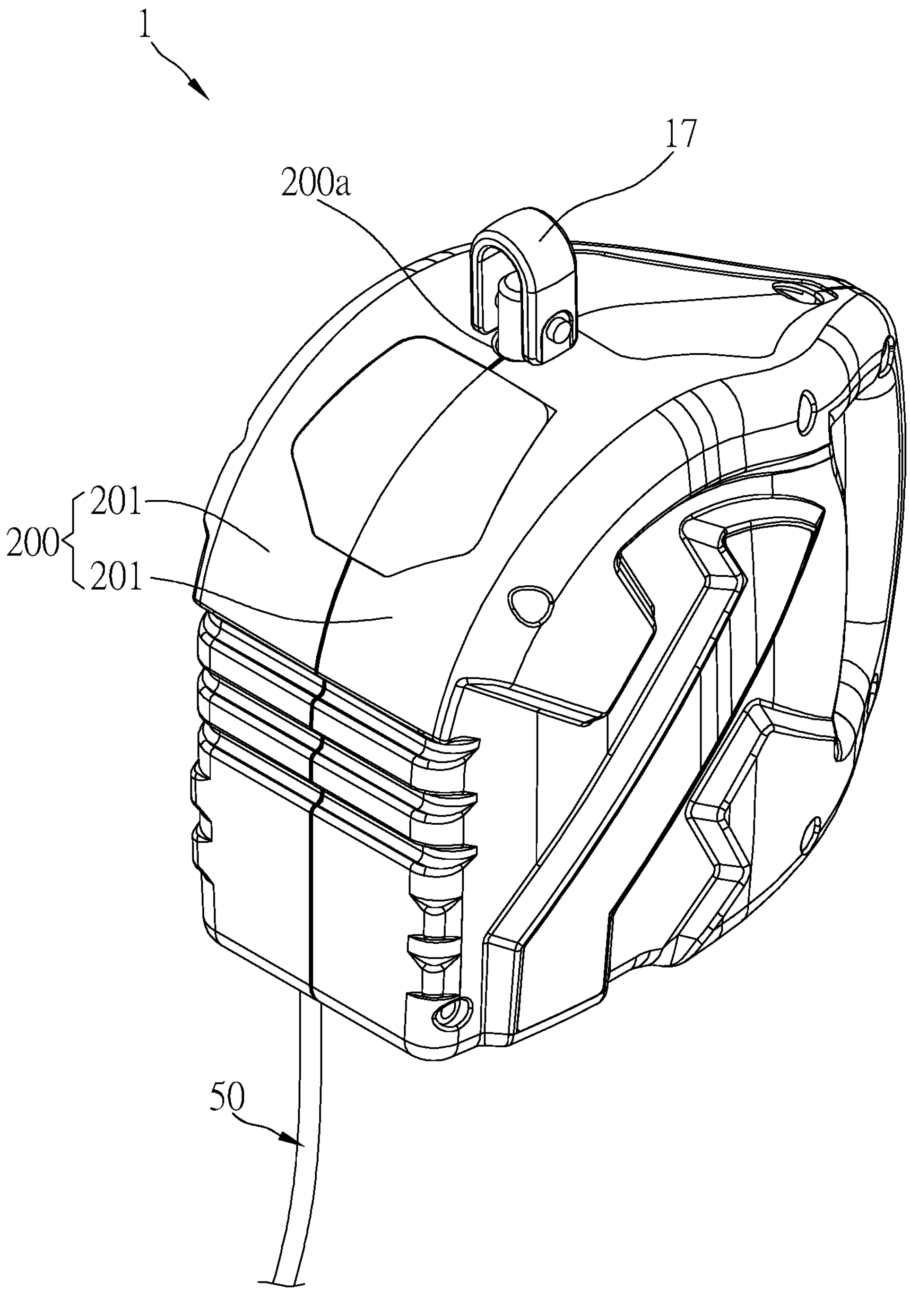
FIG. 1 is a perspective view of the fall arrester of the first embodiment of the present invention.
Figure 2:
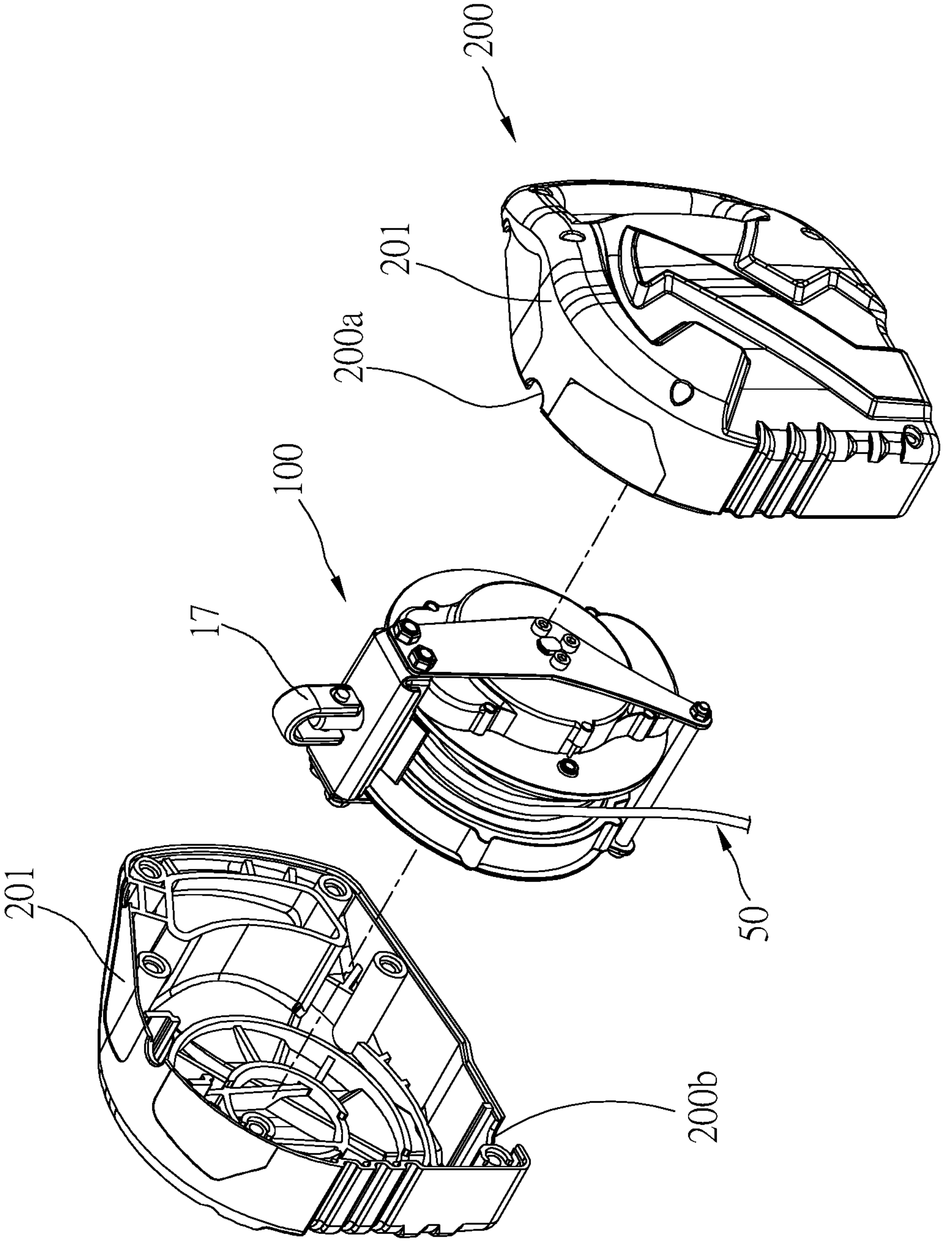
FIG. 2 is a partial exploded view of the fall arrester in FIG. 1.

As shown in FIG. 1 and FIG. 2, a first embodiment of the present invention, a fall arrester 1 includes a fall arrester body 100 and a case 200. The case 200 is formed by a combination of two half cases 201, and the fall arrester body 100 is located in an accommodation space formed by the two half cases 201. The case 200 has a hanging hole **200*a* at an upper part thereof, and a through hole 200*b*** at a lower part thereof.

Figure 3:
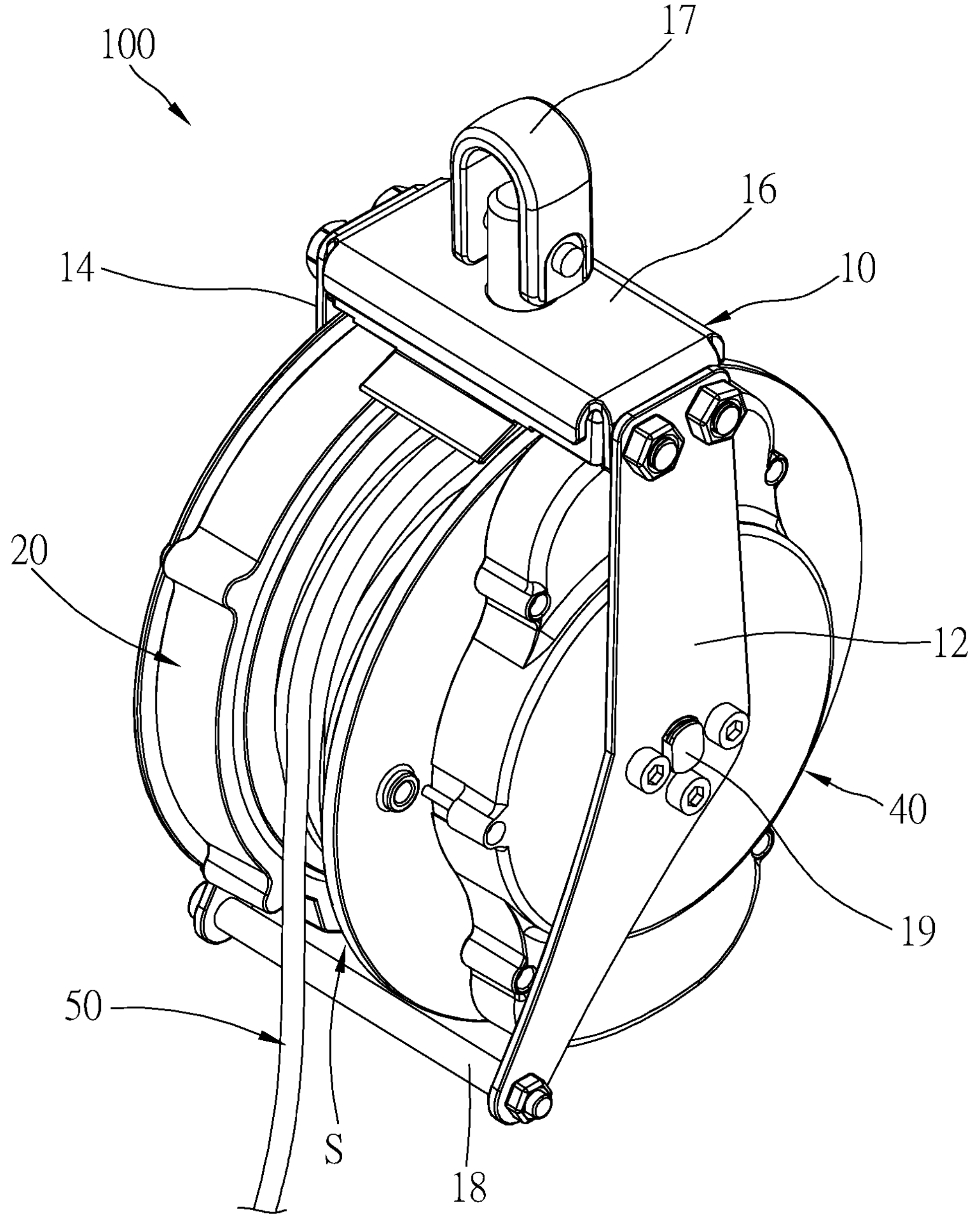
FIG. 3 is a perspective view of the fall arrester body of the first embodiment.
Figure 4:
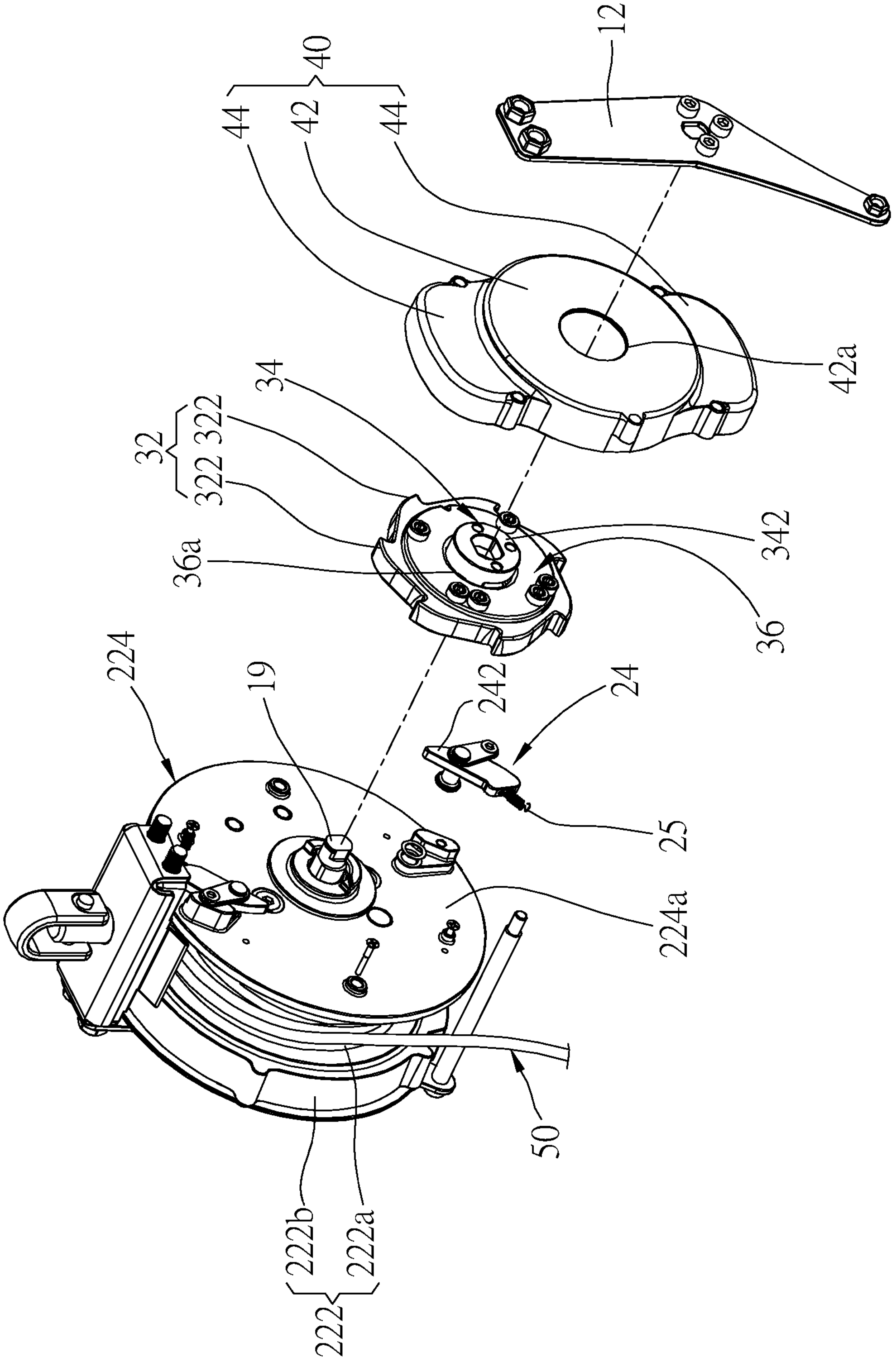
FIG. 4 is a partial exploded view of the fall arrester body in FIG. 3.

As depicted in FIG. 3 and FIG. 4, the fall arrester body 100 includes a holder 10, a rotating drum 20, a braking device 30, and a dust cover 40. The holder 10 includes a first arm 12, a second arm 14, a top plate 16, and a connecting rod 18. The upper parts and lower parts of the first arm 12 and the second arm 14 are respectively connected to each other fixedly by the top plate 16 and the connecting rod 18. The first arm 12, the second arm 14, the top plate 16, and the connecting rod 18 surround and form an accommodation space S. Moreover, a ring 17 is disposed on the top plate 16 and passes through the hanging hole **200*a***, and can further be hung or tied to a support, wherein the support can be but is not limited to a steel beam or cable.

The rotating drum 20 is located in the accommodation space S. A pivot hinge 19 passes through the canter of the rotating drum 20, and two ends of the pivot hinge 19 are fixedly connected to the first arm 12 and the second arm 14, respectively. In this way, the rotating drum 20 is pivotally connected to the holder 10 by the pivot hinge 19, and can therefore rotate relative to the holder 10 within the accommodation space S. The rotating drum 20 includes a main body 22 and two pawls 24, wherein the main body 22 has an accommodating part 222 and a setting part 224.

The accommodating part 222 can be divided into a reduced diameter part 222*a* and an enlarged diameter part 222*b* in an axial direction thereof, wherein the reduced diameter part 222*a* is caved along a radial direction of the main body 22, and the enlarged diameter part 222*b* expands along the radial direction of the main body 22. A side edge in an axial direction of the reduced diameter part 222*a* of the accommodating part 222 is connected to the enlarged diameter part 222*b* of the accommodating part 222. Additionally, the reduced diameter part 222*a* and the enlarged diameter part 222*b* in this embodiment are integral, but this is not a limitation of the present invention. Another side edge in the axial direction of the reduced diameter part 222*a* of the accommodating part 222 is detachably connected to the setting part 224. However, in other practical applications, the accommodating part 222 and the setting part 224 could also be integral. In the first embodiment, a cable 50 is wound around an outer periphery of the reduced diameter part 222*a* of the accommodating part 222, and is limited to be located between the enlarged diameter part 222*b* of the accommodating part 222 and the setting part 224. Furthermore, a free end of the cable 50 passes through the through hole 200*b* and is exposed to the outside of the case 200 for being pulled to drive the rotating drum 20 to rotate. The accommodating part 222 is not limited to be wound by the cable 50, and can be wound by other flexible long strips such as rope or lifeline.

Figure 5:
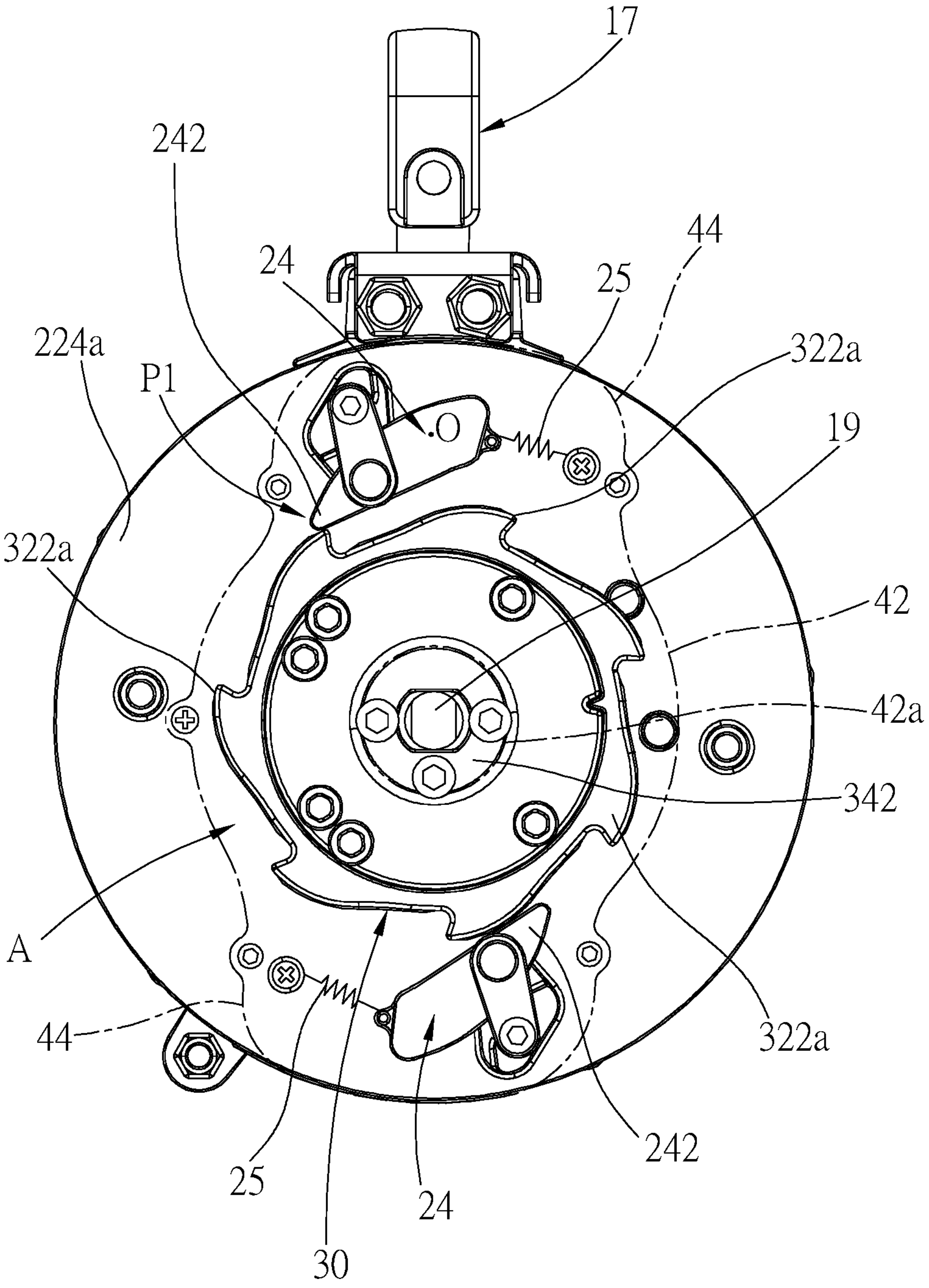
FIG. 5 is a right side view of the fall arrester body in FIG. 3, wherein the first arm is detached.
Figure 6:
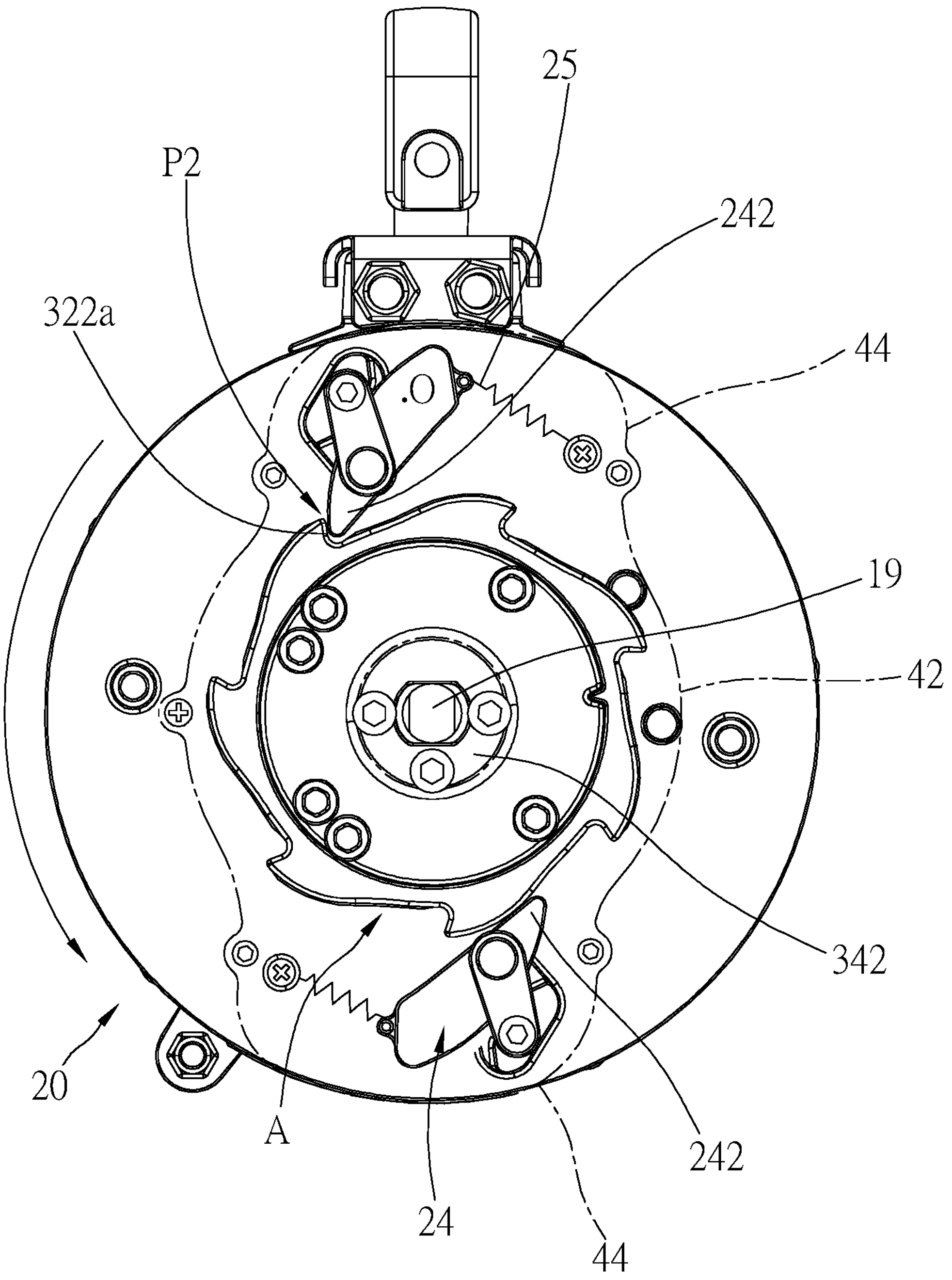
FIG. 6 is similar to FIG. 5, showing that when the rotating drum rotates quickly, the first abutting portion is located in the second position and abuts against the second abutting portion.

The two pawls 24 of the rotating drum 20 are pivotally installed on an outer wall 224*a* of the setting part 224, and are located at two opposite sides of the outer wall 224*a* respectively. Each of the pawls 24 has a first abutting portion 242 which is located at a tip of each pawl 24. In addition, an end portion that is opposite to the first abutting portion 242 of each pawl 24 is connected to a retractable spring 25. An end of each retractable spring 25 is connected to the pawl 24, and the other end is fixed to the outer wall 224*a* of the setting part 224. In the first embodiment, the retractable spring 25 fits around a stud which is fixed to the outer wall 224*a* so as to be fixed to the outer wall 224*a*. The retractable spring 25 is provided for keep each pawl 24 in a first position P1; in other words, without any external force, the pawl 24 can be maintained in a normally open state without touching the braking device 30. As shown in FIG. 5 and FIG. 6, when an external force that is more than a predetermined force acts on the pawl 24, the pawl 24 can resist the restoring force of the retractable spring 25 and pivot, which makes the first abutting portion 242 move from the first position P1 to a second position P2. The distance between the first position P1 and a center of the pivot hinge 19 is greater than the distance between the second position P2 and the center of the pivot hinge 19.

The braking device 30 fits around the pivot hinge 19, and is located between the first arm 12 and the setting part 224. The braking device 30 includes a ratchet wheel 32, a center shaft plate 34, and a cover plate 36. The ratchet wheel 32 has a plurality of ratchet teeth 322 on a periphery thereof. A tip of each of the ratchet teeth 322 constitutes a second abutting portion 322*a*. The distance between each second abutting portion 322*a* and the center of the pivot hinge 19 is fixed and greater than the distance between the first abutting portion 242 in the second position P2 and the center of the pivot hinge 19. That is, each second abutting portion 322*a* is located on a rotation path of the first abutting portion 242 in the second position P2, formed by the rotation of the rotating drum 20. The cover plate 36 has a penetration hole 36*a*. The center shaft plate 34 has a convex portion 342 which protrudes outward form a surface center of the center shaft plate 34 along a center axis thereof, wherein the convex portion 342 inserts into the penetration hole 36*a* and is fixed to the first arm 12. A part of the center shaft plate 34 is located between the ratchet wheel 32 and the cover plate 36, and the cover plate 36 is fixed to the ratchet wheel 32, so that two plate surfaces of the center shaft plate 34 are in frictional contact with the ratchet wheel 32 and the cover plate 36 respectively so as to form a frictional decelerating device. Therefore, the ratchet wheel 32 and the cover plate 36 can be frictionally rotated relative to the fixed center shaft plate 34.

The dust cover 40 includes a main cover 42 and two auxiliary covers 44, wherein the main cover 42 has a hole 42*a* in a center thereof; the two auxiliary covers 44 are connected to a periphery of the main cover 42, and located on two opposite sides. The dust cover 40 is fixed to the outer wall 224*a* of the setting part 224, and is located between the setting part 224 and the first arm 12. Furthermore, the abovementioned convex portion 342 protrudes from the hole 42*a* and is fixed to the first arm 12. An enclosed space A is formed between the dust cover 40 and the setting part 224, and the braking device 30 is located in the main cover 42. The two pawls 24 are located in the two auxiliary covers 44 respectively. In addition, the contour of the hole 42*a* of the dust cover 40 is corresponding to the shape of the convex portion 342, which prevents a gap formed between the hole 42*a* and the convex portion 342 from being too large, making dust enter the enclosed space A from the gap, or alternatively prevents the tight fit between the hole 42*a* and the convex portion 342, which hinders the dust cover 40 from rotating relative to the convex portion 342.

Figure 7:
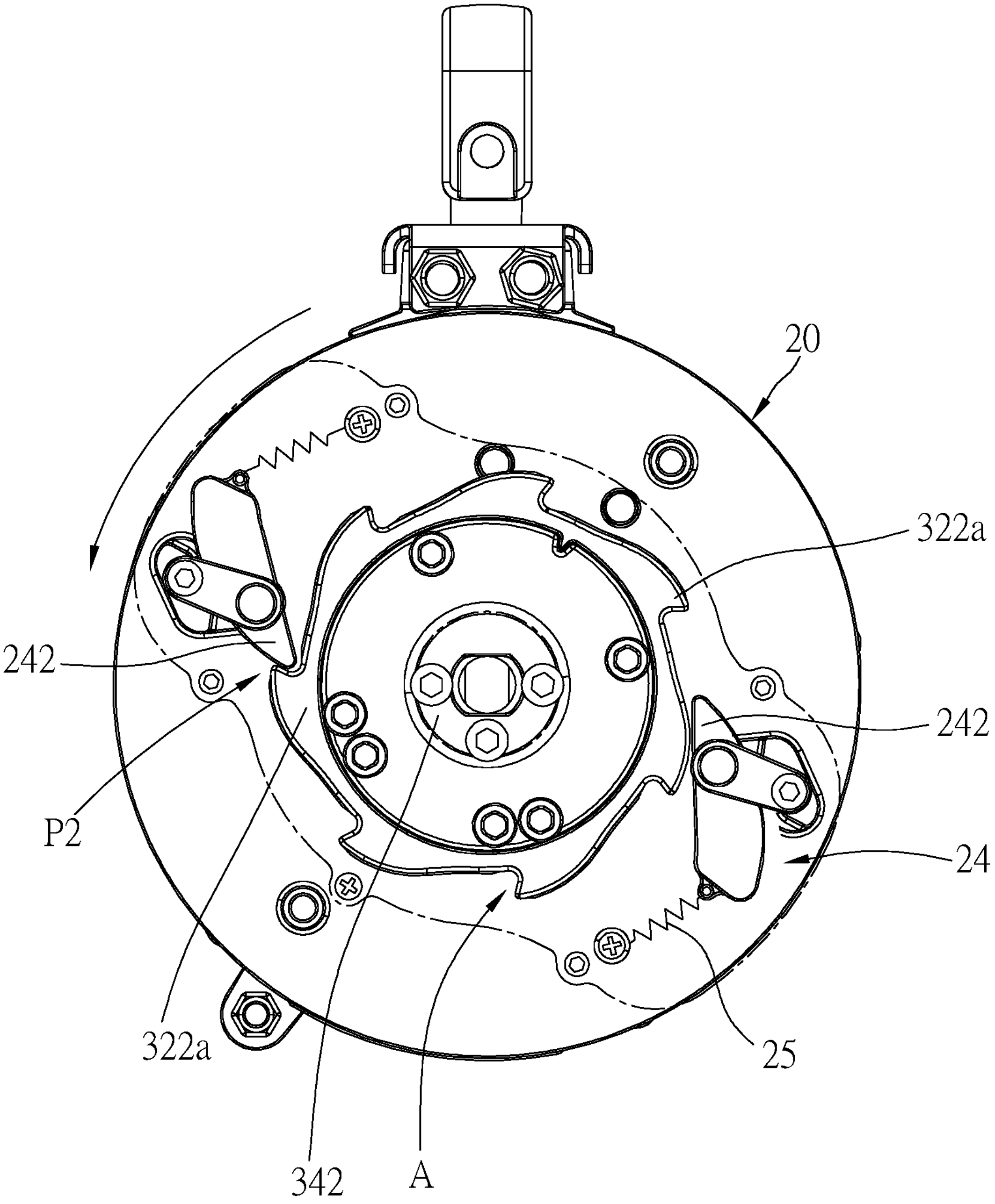
FIG. 7 is similar to FIG. 6, showing that the rotating drum slows down.

By such design, as shown in FIG. 5 to FIG. 7, when using the present invention, the ring 17 on the holder 10 is fixed to a support, and the exposed free end of the cable 50 is fastened to the operator working in a high-altitude place. When the operator is normally working, the cable 50 will be slowly pulled out of the case 200, and the pawl 24 maintains its first abutting portion 242 in the first position P1 due to the restoring force of the retractable spring 25. If the operator accidentally falls from a height, the cable 50 would be pulled out of the case 200 quickly, and thus drives the rotating drum 20 to rotate at a speed which is equal to or more than a predetermined speed, which makes the center of gravity O of each pawl 24 be thrown out due to a centrifugal force generated by the rotation of the rotating drum 20, wherein the centrifugal force is greater than the restoring force of the retractable spring 25, so that the first abutting portion 242 of each pawl 24 pivots from the first position P1 to the second position P2. Therefore, the first abutting portion 242 of the rotating drum 20 in the rotating state can abut against the second abutting portion 322*a* of the braking device 30; affected by the friction among the ratchet wheel 32 and the cover plate 36, which are driven by the first abutting portion 242, and the center shaft plate 34 fixed on the first arm 12, the rotating drum 20 gradually slows down so as to stop the rotating drum 20. In this embodiment, the change in the length of arrows on the left in FIG. 6 and FIG. 7 represents the decrease in the rotational speed of the rotating drum 20. In addition, when the centrifugal force generated by the rotation of the rotating drum 20 to the pawl 24 is less than the restoring force of the retractable spring 25, the first abutting portion 242 would pivot from the second position P2 back to the first position P1. However, in other practical applications, the rotating drum 20 could be immediately stopped once the first abutting portion 242 abuts against the second abutting portion 322*a*.

In the first embodiment, the number of the pawls 24 is two, but this is not a limitation of the present invention. Using one pawl, even more than three pawls, cooperating to the braking device, can also achieve the purpose of stopping the rotation of the rotating drum. For example, in another embodiment, the number of the pawls is three, and the distance between each pawl and the pivot hinge are the same, and the distance between any two adjacent pawls are the same as well. By such design, the bonding strength between the pawls and the ratchet wheel can be strengthened. Additionally, in said another embodiment, the number of the auxiliary covers of the dust cover is also increased to three, and each auxiliary cover covers one of the pawls to achieve the purpose of dust prevention. From the above, there is a positive correlation between the number of the pawls and the number of the auxiliary covers. Moreover, the purpose of the design that uses the main cover with auxiliary covers rather than a whole piece of dust cover is to save the material cost of producing the dust cover.

From the above, the dust cover 40 covers the braking device 30 and the pawls 24 to prevent external dust from affecting the fall arrest function of the fall arrester, and thus to maintain the product safety.

It must be noted that the embodiments described above are only preferred embodiments of the present invention. All equivalent structures which employ the concepts disclosed in this specification and the appended claims should fall within the scope of the present invention.

What is claimed is:

1. A fall arrester, comprising:

a holder which comprises a first arm and a second arm;

a rotating drum which is pivotally provided on the holder and located between the first arm and the second arm; the rotating drum comprises a main body and at least one pawl, wherein the main body has an accommodating part and a setting part; the accommodating part is provided to be wound by a flexible long strip; the at least one pawl has a first abutting portion and is pivotally provided on the setting part; when the rotating drum rotates at a speed which is equal to or more than a predetermined speed, the first abutting portion of the at least one pawl pivots form a first position to a second position;

a braking device which has a convex portion and is fixed to the first arm by the convex portion so that the braking device is located between the first arm and the setting part; the braking device further has a second abutting portion which is located on a rotation path of the first abutting portion in the second position, wherein the rotation path is formed by the rotation of the rotating drum; thus, the second abutting portion can abut against the first abutting portion to stop the rotation of the rotating drum; and a dust cover which is fixed to the setting part and is located between the setting part and the first arm; an enclosed space is formed between the dust cover and the setting part, and the at least one pawl and the braking device are located in the enclosed space; the dust cover has a hole, and the convex portion protrudes from the hole;

wherein the dust cover is continuously rotated in tandem along with the rotating drum;

wherein the dust cover comprises a main cover and at least one auxiliary cover which is connected to a periphery of the main cover; the braking device is located in the main cover, and the at least one pawl is located in the at least one auxiliary cover.

2. The fall arrester of claim 1, wherein a contour of the hole of the dust cover is corresponding to a shape of the convex portion.

3. A fall arrester, comprising:

a holder which comprises a first arm and a second arm;

a rotating drum which is pivotally provided on the holder and located between the first arm and the second arm; the rotating drum comprises a main body and at least one pawl, wherein the main body has an accommodating part and a setting part; the accommodating part is provided to be wound by a flexible long strip; the at least one pawl has a first abutting portion and is pivotally provided on the setting part; when the rotating drum rotates at a speed which is equal to or more than a predetermined speed, the first abutting portion of the at least one pawl pivots form a first position to a second position;

a braking device which has a convex portion and is fixed to the first arm by the convex portion so that the braking device is located between the first arm and the setting part; the braking device further has a second abutting portion which is located on a rotation path of the first abutting portion in the second position, wherein the rotation path is formed by the rotation of the rotating drum; thus, the second abutting portion can abut against the first abutting portion to stop the rotation of the rotating drum; and a dust cover which is fixed to the setting part and is located between the setting part and the first arm; an enclosed space is formed between the dust cover and the setting part, and the at least one pawl and the braking device are located in the enclosed space; the dust cover has a hole, and the convex portion protrudes from the hole;

wherein the dust cover comprises a main cover and two auxiliary covers which are connected to a periphery of the main cover; the braking device is located in the main cover, and the two pawls are located in the two auxiliary covers;

wherein the dust cover is rotated along with the rotating drum.

* * * * *